(No Model.)

R. A. McCARTY & C. M. JOHNSON.
CASH CARRIER.

No. 283,912. Patented Aug. 28, 1883.

Witnesses:
E. W. Quincy
H. W. Well

Inventors,
Robert A. McCarty,
Charles M. Johnson;
per A. B. Upham,
Attorney in fact.

N. PETERS. Photo-Lithographer, Washington, D. C.

UNITED STATES PATENT OFFICE.

ROBERT A. McCARTY, OF PORT HURON, MICHIGAN, AND CHARLES M. JOHNSON, OF PEORIA, ILLINOIS, ASSIGNORS OF ONE-THIRD TO CHARLES B. ALLAIRE, OF PEORIA, ILLINOIS.

CASH-CARRIER.

SPECIFICATION forming part of Letters Patent No. 283,912, dated August 28, 1883.

Application filed April 30, 1883. (No model.)

*To all whom it may concern:*

Be it known that we, ROBERT A. MCCARTY and CHARLES M. JOHNSON, of Port Huron, Michigan, and Peoria, in the county of Peoria, in the State of Illinois, respectively, have invented an Improved Cash-Carrier; and we do hereby declare that the following is a full, clear, and exact description thereof, reference being had to the annexed drawings, making a part of this specification, in which like letters of reference refer to like parts, and in which—

Figure 1:
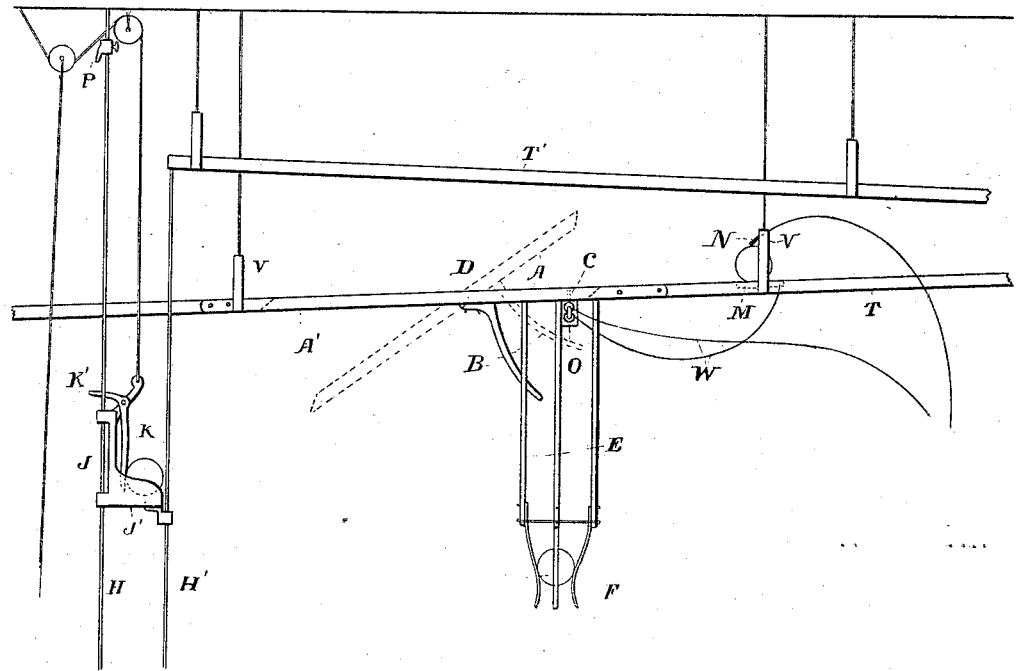
Figure 2:
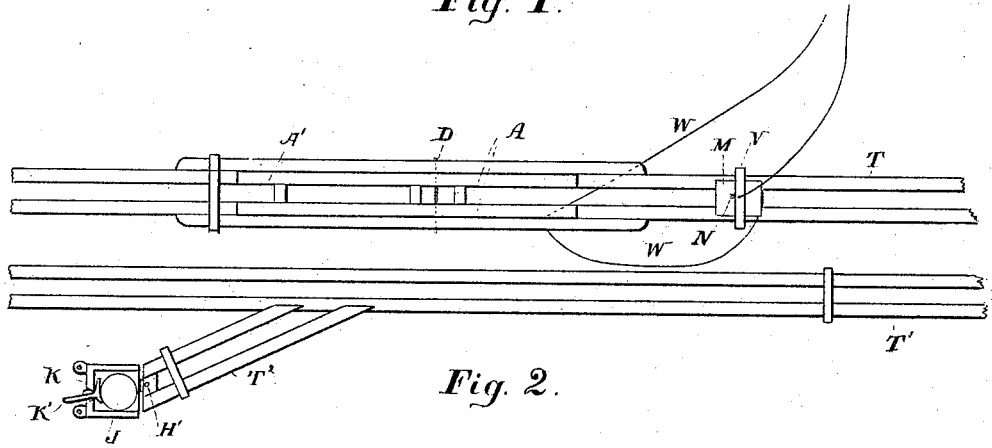
Figure 3:
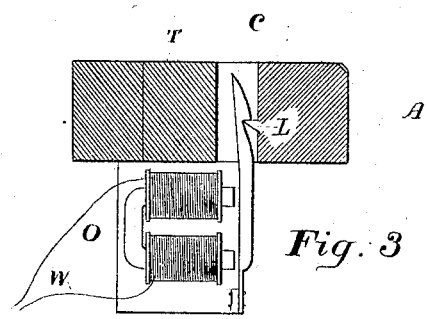

Figure 1 represents a side elevation; Fig. 2, a plan; Fig. 3, a detail.

Our invention is in that line of cash-carriers in which a hollow ball adapted to receive cash is arranged to roll back and forth upon oppositely-inclined tracks or ways.

Our improvement relates especially to the mode of opening and closing the traps through the track by means of which the hollow ball is allowed to drop therefrom to a receptacle beneath, and to the elevator by means of which the ball is raised up onto the track.

In the drawings, T represents the track from the cashier to the clerk, and T' the return-track.

A is the trap, pivoted at D to the track T, and having its lower end the heavier.

C is a spring-catch, which retains the trap A in position to allow the cash-balls to roll on over it. Said spring-catch C is so controllable by means of an electro-magnet, O, (shown in Fig. 3,) that by the passage of an electric current through the magnet's connecting-wires the catch C is released from the trap A, and the latter falls into the position shown by the dotted lines in Fig. 1.

To the under side of the trap A, and projecting under its upper end, is the arm B, rigidly fastened thereto.

Vertical rods E are suspended from the track T, below the upper end of the trap A, and to the lower ends of said rods are fastened inwardly-bent springs F.

The mechanism thus far described works as follows: To keep the trap A in place the circuit-wires W are separate, and the spring-catch C remains engaged with the catch L of said trap. To open the trap A and cause a cash-ball to drop therefrom, the circuit-wires are joined, and the electro-magnet O being made magnetic thereby, the spring-catch C is withdrawn from the catch L and the trap A opens. The first cash-ball, therefore, that comes rolling down the track T falls through the opening into the cage E. In its descent, however, it comes in contact with the arm B, and by its weight carries said arm on downward; but this arm B being rigidly fastened to the trap A, said trap is instantly closed thereby, and when closed retained so by the spring-catch C, which has been released by the opening of the circuit. The cash-ball continues its descent, however, until forced to stop by the inwardly-bent springs F at the bottom of the cage E. From these springs F the ball is taken by the clerk by simply reaching up and pulling it down from between the said springs F. To cause the releasing of the trap A to be automatically done by the cash-ball itself can be done by either having the cash-ball to pass between two contiguous ends of the circuit-wires W, and thus itself complete the circuit, or have it in its passage strike a button or lever that shall close the circuit. The former of these ways is the one we have shown in the drawings and construct it as follows: One end of the wire W is joined to a metal plate, M, set down flush in the track T. The end of the other part of the wire W touches a spring or metal brush, N, which hangs downward from the stirrup or other support, V, just far enough to touch a cash-ball rolling beneath. The ball, being made of or coated with metal or other conductive material, instantly completes the circuit as it passes between the plate and spring or brush, but opens it again as it passes on. To enable several balls to go upon one track and each drop into its correct trap, the balls are made of different diameters, the largest nearest the starting-place, and the springs or brushes N placed at heights to correspond. A smaller ball not being able to reach the brush of a larger ball, the circuit of any trap is not closed except by its own cash-ball.

The device for raising the cash-balls up onto the track T' consists of a box, J, having front side removed and vertically movable upon three rods, H H H', by means of suitable cords and pulleys. In Fig. 1 this elevator is shown as attached to the end of the track T', while in Fig. 2 it is shown as attached to the end of a switch-track, T², leading onto said track T'. To remove the cash-ball from said elevator J and give it good headway as it starts upon the track, we pivot to the upper part of said elevator an angle-iron, K. Now, when the elevator is carried up into the level of the track, the end K' of the angle-iron K is carried downward by coming in contact with the stop P, fastened to one of the rods H, and its lower arm caused to fly forward. This push of the longer arm of the angle-iron K sends the cash-ball out from the elevator and off along the track with a rush. The elevator guide-rod H' is fastened at its upper end to the end of the track or switch-track, and forms a stop to prevent the cash-ball from rolling out of the elevator until the same is raised above the track.

Instead of having the track released automatically by the method just shown, we also design to have the circuit-wires of the electro-magnets O connect with an annunciator at the cashier's desk, by means of which any desired trap can be opened at the will of the cashier.

What we claim as our invention, and for which we desire Letters Patent, is as follows:

1. In a cash-carrier system, a track and trap provided with a catch by means of which said trap is retained closed, in combination with an electro-magnet and circuit-wires, whereby said catch is made to release said trap and permit it to open.

2. In a cash-carrier system, a track and trap provided with a catch by means of which said trap is retained closed, and an electro-magnet and circuit-wires, whereby said catch is made to release said trap and permit it to open, in combination with a depending arm rigidly fastened to said trap, against which a falling ball impinges and closes said trap.

3. In combination with a track, T, a pivoted trap, A, having depending arm B and catch L, the spring-catch C, electro-magnet O, circuit-wires W, and means for opening or closing the circuit.

4. In a cash-carrier system, a track and trap having a catch by means of which said trap is retained closed, in combination with an electro-magnet, circuit-wires, and means whereby, during the contact therewith of a cash-ball rolling by upon the track, the circuit of said wires is closed.

5. A track, T, pivoted trap A, having catch L, spring-catch C, electro-magnet O, and circuit-wires W, in combination with plate M, brush or spring N, and a rolling box or ball having an electro-conductive surface, substantially as and for the purpose specified.

6. A track, T, pivoted trap A, spring-catch C, electro-magnet O, and circuit-wires, in combination with the cage E, having bent springs F, substantially as and for the purpose set forth.

7. In a cash-carrier system, an inclined track, T, in combination with a trap, A, pivoted at or near its center, and having its lower end, A', the heavier, a spring-catch, C, having means by which a rolling ball can free said trap from said spring, and a depending arm, B, whereby the ball shall in falling close said trap.

8. A track, T, trap A, having catch L and depending arm B, spring-catch C, electro-magnet O, circuit-wires W, plate M, and spring or brush N, in combination with the cage E, having bent springs F, substantially as and for the purpose set forth.

9. In a store-service system, the elevator J, having angle-iron K pivoted thereto, in combination with rods H H H', stop P, and track T', substantially as and for the purpose herein described.

10. In a cash-carrier system, a cash-ball or rolling box having a continuous electro-conductive surface, for the purpose set forth.

In testimony that we claim the foregoing invention we have hereunto set our hands this 25th day of April, 1883.

ROBERT A. McCARTY.
CHARLES M. JOHNSON.

Witnesses:
H. W. WELLS,
RICHD. A. GOLDSBROUGH.